Nov. 3, 1953  J. H. McGINN  2,657,707
FLUID CONTROL APPARATUS
Filed Sept. 10, 1949
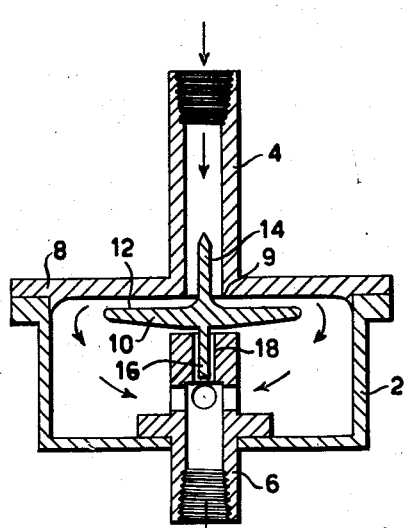
FIG. 1.
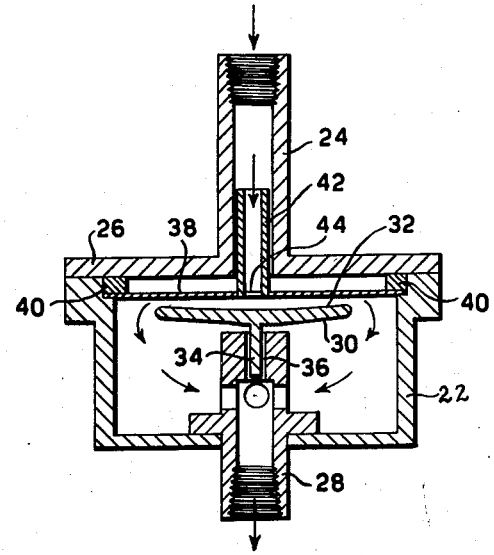
FIG. 4.
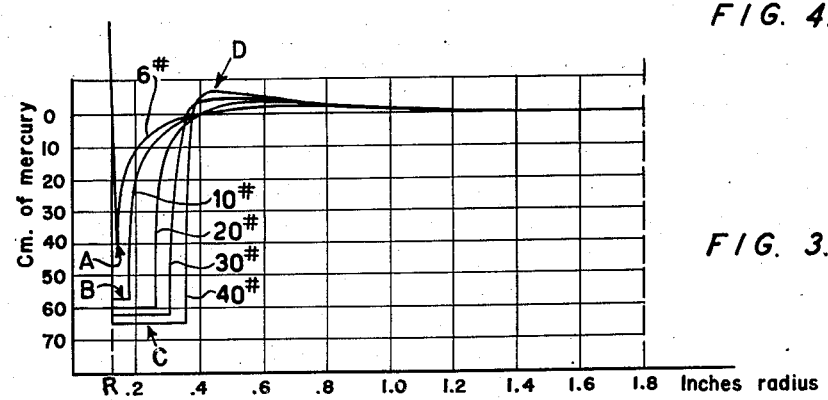
FIG. 3.
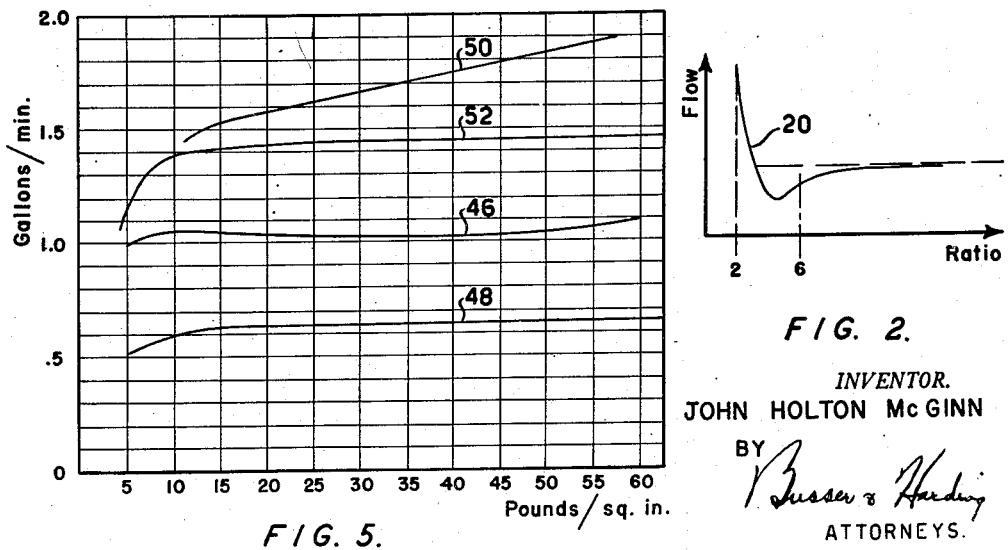
FIG. 5.
FIG. 2.
INVENTOR.
JOHN HOLTON McGINN
BY
ATTORNEYS.

Patented Nov. 3, 1953

2,657,707

UNITED STATES PATENT OFFICE 2,657,707

FLUID CONTROL APPARATUS

John Holton McGinn, Philadelphia, Pa.

Application September 10, 1949, Serial No. 115,029

9 Claims. (Cl. 137—504)

This invention relates to fluid control apparatus particularly designed to provide a desired relationship between the rate of flow of a fluid and the pressure gradient which causes the flow.

This application is a continuation-in-part of my application Serial Number 39,891, filed July 21, 1948, now abandoned.

An ordinary orifice has a positive characteristic in that with increase of pressure gradient across the orifice the rate of flow increases. In many cases it is desired that the flow rate should remain constant or that it should vary otherwise than in accordance with the orifice law when the pressure is varied. To achieve this end there has generally been provided relatively complicated apparatus responsive to the pressure drop across an orifice through which flow is taking place, this apparatus being so arranged as to throttle the flow to secure some desired flow characteristic.

The general object of the present invention is to provide a simple apparatus which will automatically control the flow so that it may remain either constant over a wide range of pressure gradient or follow some desired law of variation with respect to the pressure gradient. For example, in accordance with the invention not only may a constant flow be provided but positive or negative characteristics of flow of various types may be readily secured.

Further objects of the invention relating to the attainment of the ends indicated above and relating to details of apparatus will become apparent from the following description read in conjunction with the accompanying drawings in which:

Figure 1 is an axial section through a form of apparatus provided in accordance with the invention to maintain a substantially constant flow rate through a large variation of pressure gradient;

Figure 2 is a graph illustrating the characteristics of the type of apparatus of Figure 1 for a constant pressure but for different ratios of the diameters of a disc and orifice involved in the apparatus;

Figure 3 is a graph showing variations of pressure with radius across a disc involved in the apparatus of Figure 1;

Figure 4 is an axial section similar to that of Figure 1 but illustrating a modification of the invention by which various desirable characteristics of flow may be secured; and Figure 5 is a graph illustrating various characteristics of flow rate plotted against pressure gradient securable in accordance with the invention.

Referring first to Figure 1 the apparatus comprises a housing 2 having an inlet connection 4 and an outlet connection 6. The inlet connection 4 is in the form of a tube connected to a cover plate 8 which has a plane lower surface, the bore of the tube providing an inlet orifice at the center of this plate. A sharp edge 9 should exist at the intersection of the bore through inlet connection 4 and the lower surface of the plate 8. Within the housing there is a rigid disc 10 having a plane upper surface 12 facing and adjacent to the plane surface of the upper plate 8. A pin 14 may be carried by the disc 10 projecting upwardly from the center thereof and having a faired upper end and an outwardly diverging lower end serving for the guidance of the flow. However, this pin is of no major importance in the attainment of the objects of the invention and may be dispensed with. Its sole function is to aid in maintaining the disc more nearly centered with respect to the bore of the inlet thereby tending to minimize any binding of a guide pin 16 projecting from the lower side of the disc in a guide bore 18 in the outlet fitting. It may be here noted that while in this description of Figure 1 reference has been made to the apparatus as if it were used with the axis of the bore and disc vertical such arrangement of the apparatus is by no means required in operation: the apparatus will function just as satisfactorily if the flow is horizontal or upwards or in any other position since the forces involved in the location of the disc 10 are very much in excess of the weight of the disc. For example, with a disc 3.6 inches in diameter and an orifice of 0.25 inch diameter, the lifting force on the disc is about 1.5 kilograms when operating at 30 pounds per square inch supply pressure. The disc may then weigh only about 0.1 kilogram.

The arrangement illustrated in Figure 1 is particularly adapted to the maintenance of a constant flow rate for a very wide range of pressure gradient between the inlet 4 and the outlet 6. In operation of the apparatus the fluid, which may be liquid or gaseous, enters the tube 4 and emerges therefrom to flow radially outwardly across the surface 12 of the disc 10 between this surface and the plane inner surface of the plate 8. As the flow takes place the disc 10 is drawn toward the plate 8 by virtue of the transformation of the energy of the incoming fluid into turbulent flow at high velocity across the surface 12 of the disc and the disc assumes a position of equilibrium which is such as to cause it to throttle the flow, with the end result of maintaining the flow rate substantially constant despite large variations in pressure gradient.

To secure the desired constant flow rate characteristic it is necessary that the diameter of the disc should bear to the diameter of the orifice a proper ratio the minimum value of which is about 6 to 1. Larger ratios than this may be used but there is little advantage in providing a ratio greater than 10 to 1 since this would merely make the apparatus dimensions larger without attendant advantage. The relationship of flow to the ratio just mentioned at constant pressure is illustrated by the curve 20 in Figure 2. Below a ratio of about 2 the disc will no longer remain in equilibrium but will be blown away from the orifice. At ratios greater than 2 the condition of the disc is somewhat unstable and the flow rate decreases to a minimum thereafter rising, with maintenance of stability of the disc in that region of the ratio upwards of about 6 to 1. To secure complete stability and maximum flow rate with the constant flow characteristics mentioned above it is accordingly desirable that this ratio or a greater ratio should be used.

Figure 3 shows curves of pressure above the disc plotted against radius measured from the axis of the disc, the pressures below the zero line indicating pressures below atmospheric. (The pressure in chamber 2 is assumed atmospheric, opening 6 communicating freely with the atmosphere.) The orifice here had a diameter of about one-quarter inch, the radius being indicated at R in this figure, and the disc had a diameter of 3.6 inches. Considering 6 pounds per square inch applied pressure in the pipe 4, a pressure slightly below the lower limit for proper control operation, the curve of pressure appears as indicated. Within the orifice area the pressure at the disc surface is approximately that of the supply. At the edge of the orifice the pressure drops to the pressure indicated at A. Then the pressure rises gradually at points on the disc which are increasingly more distant from its center, finally crossing the zero pressure axis and rising slightly above zero, then decreasing slowly to zero pressure at the outer periphery of the disc. While the disc is held upwardly toward the plate surrounding the orifice by the difference of pressures across it, the desired control action does not exist in the region of this pressure of 6 pounds per square inch, namely, if the supply pressure is increased the flow rate also increases substantially.

Between 6 pounds per square inch and 10 pounds per square inch the pressure variations with radius change substantially in character. Considering the curve corresponding to a pressure of 10 pounds per square inch, for example, the pressure is again approximately the supply pressure throughout the area of the orifice. Then the pressure rapidly drops to a value such as indicated at B and remains constant for a substantial annular region about the orifice. The pressure then rises sharply and again crosses the zero axis rising to a positive value which then gradually decreases to zero at the periphery of the disc.

The existence of the condition indicated at B in Figure 3 is apparently responsible for the control action of the apparatus. Using transparent elements of plastic material it was observed that through the annular region corresponding to B there was an appearance of radial striations of the flow indicative of intense turbulence and cavitation. Outside this region the flow apparently became free of cavitation, though probably still quite turbulent. There will, in particular, be noted the very considerable pressure drop from A of the 6 pound per square inch curve to B of the 10 pound per square inch curve with attendant appearance of the cavitation region at B. It would appear that a critical transition in mode of operation is here involved and that the cavitation region represents, in effect, the presence of the controlling function which tends to maintain the flow rate relatively independent of supply pressure variations.

At higher pressures curves similar to that obtained at 10 pounds per square inch are secured. For 40 pounds per square inch supply pressure, for example, there is secured the curve having a substantial radial extent, indicated at C, of the cavitation region corresponding to minimum and approximately constant pressure. When the various curves rise above the zero axis the rise is greater for the higher supply pressures than for the lower supply pressures. In all cases, however, the very substantial dip in pressure existing at B and C, for example, insures the maintenance of the disc in position closely adjacent to the surface of the plate surrounding the orifice.

The desirability of a sharp edge of the orifice at 9 has been previously referred to. In the case of an orifice of approximately one-quarter inch diameter it appears that the radius of the cross-section at this edge should be less than a sixteenth of an inch and preferably even less than this. If the radius of this edge is substantially greater it will be found that the conditions such as indicated at B and C do not occur at all, and instead there are secured pressure variation curves resembling that found for a pressure of 6 pounds per square inch: that is, there will exist no horizontal portions of the curves such as at B and C, but instead the pressure reaches a sharp minimum and then immediately increases to rise above the zero axis. Visual observation shows also that this condition is accompanied by a complete disappearance of the radial striations referred to above. The controlling action is also absent and instead of there being maintained a substantially constant flow with change of pressure, the flow increases with pressure in much the same fashion as for an ordinary orifice.

The operation of the apparatus is quite sensitive to deviations of the surfaces of the disc and upper plate between which flow takes place from the plane conditions which have been mentioned. At a constant pressure the flow rate rapidly increases as the space between the disc and cooperating plate is changed to a convex type such as may be secured by having a plane face on the plate opposed by a concave surface of the disc or by having a plane surface of the disc opposed by a concave surface of the plate. When the curvature of the concave surface reaches a critical value the disc position will become unstable and it will fall away from the plate. On the other hand, if reverse curvature is involved with a relative convexity of one of the elements facing the other, the flow rate decreases, there being again attained a condition, when the curvature is excessive, under which the disc will be blown away from the inlet orifice. However, advantage may be taken of the characteristics resulting from curvature as will become evident from consideration of the modification illustrated in Figure 4.

In Figure 4 a housing 22 is closed by a top plate 26 provided with an inlet tube 24 as in the previous modification. An outlet fitting 28 is also provided as previously described. A disc 30 is provided with a slightly concave upper face and is provided with a guiding pin 34 guided in a bore 36 in the outlet fitting. In this modification the inner face of the cover 26 does not serve to guide the flow. Instead a ring 40 secured in the housing supports a diaphragm 38 which has a central opening at 44 bounded by a tube 42 carried by the diaphragm 38 and extending upwardly with a loose fit in the inlet tube 24. (It may be here remarked that the inlet tube 24 in Figure 4 is not necessary; and, in fact, the inlet tube 4 in Figure 1 is not necessary, there being only required an orifice in the plate 8 which need not receive fluid from any cylindrical approach passage.) This loose fit permits the fluid to enter the chamber between the diaphragm 38 and the cover plate 26 so that this chamber is subjected to the pressure of the fluid in the inlet tube 24 and the diaphragm 38 will flex downwardly to produce a greater convexity of its lower surface as the inlet pressure increases relative to the pressure in the lower portion of the chamber 22.

The sensitivity of the flow being quite substantial with respect to the relative curvatures of the lower surface of the diaphragm and the upper surface of the disc it will be evident that this arrangement has a marked influence in control of the flow. By the use of the arrangement of Figure 4 the range of constant flow, if the parts are designed for this end, may be increased substantially in the direction of low pressure gradient. Furthermore, by suitable variations of curvature of the upper surface of the disc and by suitable choice of stiffness of the diaphragm 38 various characteristics of flow with respect to pressure gradient may be secured.

The curves reproduced in Figure 5 will serve to illustrate the various characteristics which may be secured. Using water as the fluid, the curve illustrated at 46 was secured using the arrangement illustrated in Figure 1 with a ratio of disc diameter to orifice diameter of 7.15. It will be noted that the flow rate remained approximately constant for a pressure gradient varying from about fifteen pounds per square inch to sixty pounds per square inch.

The curve illustrated at 48 was secured with a ratio of disc diameter to orifice diameter of ten and shows an even more constant flow rate through the same pressure gradient variations, though in this case the flow rate was less due to the use of a smaller orifice.

The curve illustrated at 50 representing a straight line rising characteristic of flow was obtained using a plane plate as illustrated in Figure 1 but a concave disc. In this case the ratio of disc diameter to orifice diameter was 7.15. Straight line characteristics of this type are frequently desirable in contrast to the square root variation which is normally secured merely by directing flow through an orifice.

The curve illustrated at 52 represents the results obtained using a concave disc cooperating with a diaphragm subject to variation of convexity with pressure gradient as illustrated in Figure 4. Here again the ratio of disc diameter to orifice diameter was 7.15. It may be remembered that in the case of the three curves 46, 50 and 52, the orifice size was the same so that curve 52 shows the attainment of constant flow at a substantially higher flow rate than the curve 46.

It will be evident that carrying out the progressions represented by the change from curve 50 to that of curve 52 a negative characteristic may be secured i. e. involving a flow rate which decreases with increase of pressure gradient. This end is achieved by increasing the flexibility of the diaphragm 38 so that the bulging of it toward the disc is greater with smaller pressure gradient changes.

The clearance of the housing beyond the periphery of the disc is relatively unimportant so long as it is sufficiently great to permit free flow.

The apparatus in its various forms described above is extremely rapid in its response to changes of pressure with the result that no measurable variation in flow occurs, in the constant flow type of device, even if large sudden surges of pressure are caused to occur.

It will be evident that numerous variations may be made in the embodiment of the invention without departing from the scope thereof as defined in the following claims.

What is claimed is:

1. Flow controlling means comprising a housing having a fluid inlet passage, means providing a surface having an orifice therein through which fluid from said inlet passage enters the interior of the housing, a movable disc having a surface facing said orifice and the portions of the first mentioned surface surrounding the orifice, said orifice having a substantially sharp edge disposed in a plane and adjacent to the disc, and said disc face having an effective diameter at least twice the effective diameter of said orifice, and means for guiding said disc for movements in the general direction of flow through said orifice, the edge of the disc being substantially clear of the housing throughout its range of movement to provide free radial exit of the fluid flowing outwardly between the disc and the first mentioned surface.

2. Flow controlling means of claim 1 in which at least one of said surfaces is slightly curved.

3. Flow controlling means of claim 1 in which at least one of said surfaces is concave towards the space between the surfaces.

4. Flow controlling means of claim 1 in which the first mentioned surface is variable in curvature.

5. Flow controlling means of claim 1 in which the first mentioned surface is variable in curvature, and the second mentioned surface is concave towards the space between the surfaces.

6. Flow controlling means of claim 1 in which said means providing a surface is in the form of a diaphragm arranged to flex under the pressure gradient existing between the fluid inlet passage and the interior of the housing.

7. Flow controlling means of claim 1 in which said means providing a surface is in the form of a flexible diaphragm.

8. Flow controlling means of claim 1 in which said means providing a surface is in the form of a diaphragm arranged to flex under the pressure gradient existing between the fluid inlet passage and the interior of the housing, and in which the second mentioned surface is concave towards the space between said surfaces.

9. Flow controlling means comprising a housing having a fluid inlet passage, means providing a surface having an orifice therein through which fluid from said inlet passage enters the interior of the housing, a movable disc having a surface facing said orifice, said disc and orifice being constructed and arranged to provide abrupt deflection of flow from axial direction through the orifice to substantially radial direction between the disc and the first mentioned surface, and said disc surface having an effective diameter at least twice the effective diameter of said orifice, and means for guiding said disc for movements in the general direction of flow through said orifice, the edge of the disc being substantially clear of the housing throughout its range of movement to provide free radial exit of the fluid flowing outwardly between the disc and the first mentioned surface.

JOHN HOLTON McGINN.

References Cited in the file of this patent

UNITED STATES PATENTS

| Number | Name | Date |
|---|---|---|
| 163,255 | Rehn | May 11, 1875 |
| 263,551 | Chamberlain | Jan. 11, 1881 |
| 543,448 | Lowe | July 23, 1895 |
| 573,157 | Meyer | Dec. 15, 1896 |
| 574,570 | Pollock | Jan. 15, 1897 |
| 1,234,378 | Parkin | July 24, 1917 |